US008646087B2

(12) United States Patent
Pistola et al.

(10) Patent No.: US 8,646,087 B2
(45) Date of Patent: Feb. 4, 2014

(54) ANSWERING SECURITY QUERIES STATICALLY BASED ON DYNAMICALLY-DETERMINED INFORMATION

(75) Inventors: Marco Pistola, Amawalk, NY (US); Omer Tripp, Bronx, NY (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/957,529

(22) Filed: Dec. 1, 2010

(65) Prior Publication Data

US 2012/0144491 A1    Jun. 7, 2012

(51) Int. Cl.
*G06F 21/57* (2013.01)
*G06F 21/00* (2013.01)

(52) U.S. Cl.
USPC ............................................. 726/25; 717/127

(58) Field of Classification Search
None
See application file for complete search history.

(56) References Cited

U.S. PATENT DOCUMENTS

```
7,712,093 B1 *  5/2010  Foley ............................ 717/155
7,743,423 B2 *  6/2010  Lange et al. ..................... 726/26
7,849,509 B2 * 12/2010  Venkatapathy et al. ........ 726/25
2005/0108562 A1 *  5/2005  Khazan et al. ................. 713/200
2007/0124817 A1 *  5/2007  Larsen ............................ 726/25
```

OTHER PUBLICATIONS

Tripp, Omer, et al., "TAJ: Effective Taint Analysis of Web Applications", ACM 2009, 11 pgs.

* cited by examiner

*Primary Examiner* — Fikremariam A Yalew
(74) *Attorney, Agent, or Firm* — Harrington & Smith; Louis J. Percello (57) ABSTRACT

A method includes analyzing execution of a software program, the software program having sources returning values, sinks that perform security-sensitive operations on those returned values or modified versions of the returned values, and flows of the returned values to the sinks, the analyzing determining a first set of methods having access to a value returned from a selected one of the sources. A static analysis is performed on the software program, the static analysis using the first set of methods to determine a second set of methods having calling relationships with the selected source, the static analysis determining whether the returned value from the selected source can flow through a flow to a sink that performs a security-sensitive operation without the flow to the sink being endorsed, and in response, indicating a security violation. Apparatus and computer program products are also disclosed.

23 Claims, 8 Drawing Sheets

ANSWERING SECURITY QUERIES STATICALLY BASED ON DYNAMICALLY-DETERMINED INFORMATION

BACKGROUND

This invention relates generally to analysis of software programs such as object code, byte code, source code, executable code, and libraries, and, more specifically, relates to analysis of software programs both during execution of the software programs and during static analysis of the software programs.

Static analysis is a type of analysis performed on a software program, where the software program is analyzed without actual execution of the software program. Typically, this analysis is performed using the source or object code of the software program and a line-by-line analysis of the program. Additionally, other tools such as points-to or call graphs may be used to aid the analysis.

The challenge of verifying whether a given program suffers from security vulnerabilities is of great importance. Static analysis techniques are a natural candidate for performing this task since they are sound; that is, if the analysis flags a vulnerability, then the report may either be a true positive or a false positive. On the other hand, if the analysis indicates that there are no vulnerabilities, then this is guaranteed to be the case. Put differently, there are no false negatives.

The most fundamental limitation of static-analysis techniques lies on the notorious tradeoff they are forced to make between precision and scalability: The analysis can often not be both precise and scalable, and it is nearly impossible to find the "sweet spot" between these two extremes given the large variety of target programs.

SUMMARY

In an aspect of the invention, a method includes analyzing execution of a software program. The software program has sources returning values, sinks that perform security-sensitive operations on those returned values or modified versions of the returned values, and flows of the returned values from the sources, through methods, and to the sinks. The analyzing determines a first set of methods having access to a value returned from a selected one of the sources. The method includes performing a static analysis on the software program. The static analysis uses the first set of methods to determine a second set of methods having calling relationships with the selected source. The static analysis further determines whether the returned value from the selected source can flow through a flow to a sink in the second set of methods that performs a security-sensitive operation without the flow to the sink being endorsed. In response to determining the returned value from the selected source can flow through the flow to the sink in the second set of methods that performs a security-sensitive operation, a security violation is indicated. Computer program products and apparatus are also disclosed.

DETAILED DESCRIPTION

Figure 1:
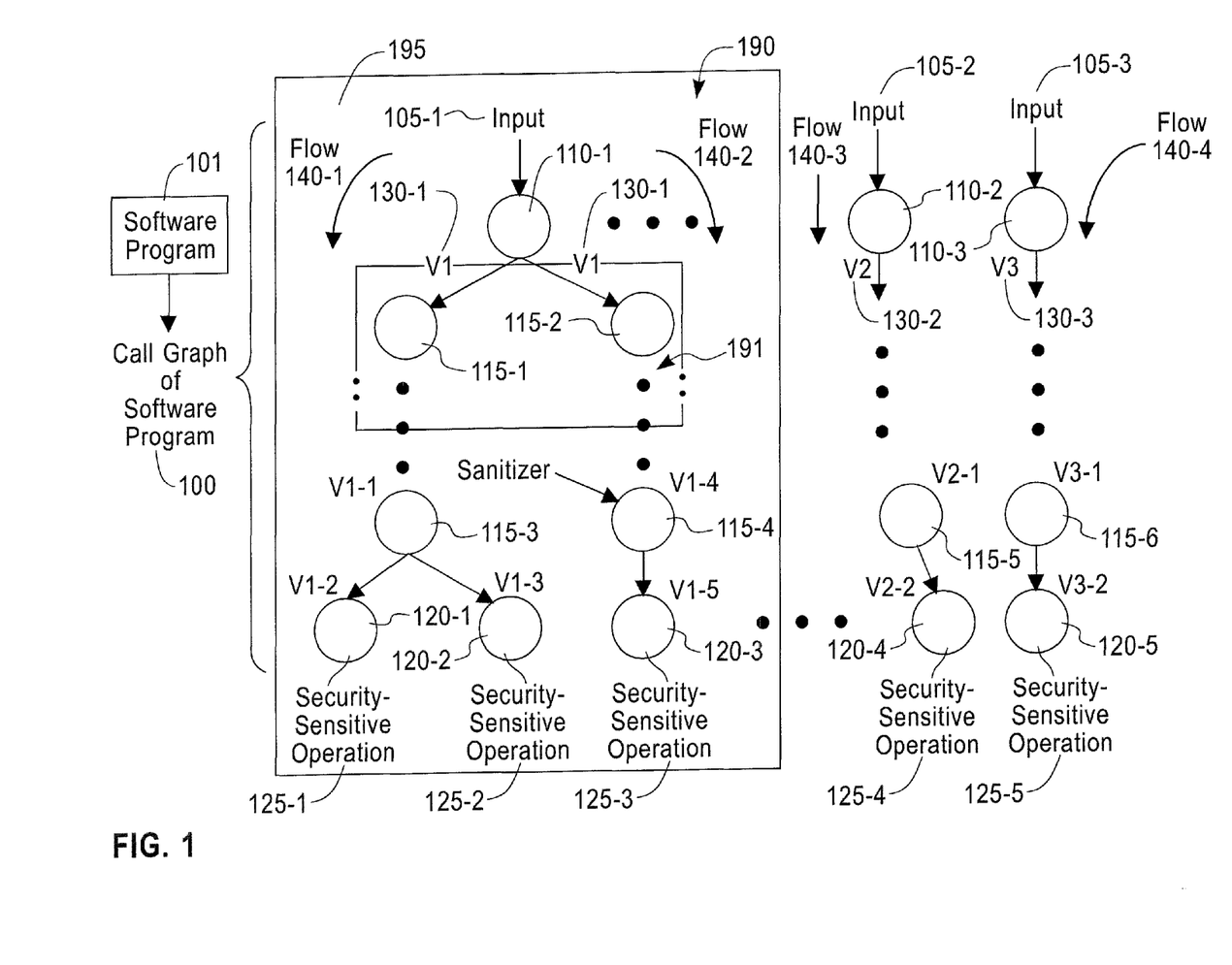
FIG. 1 is an exemplary call graph of a software program, used to illustrate aspects of the invention.

Referring now to FIG. 1, this figure shows an exemplary call graph 100 of a software program 101, used to illustrate aspects of the invention. Through known techniques, using static analysis, a call graph 100 is created from a software program 101. The call graph 100 illustrates calling relationships between sources 110 (of which sources 110-1 through 110-3 are shown), methods 115 (of which methods 115-1 through 115-6 are shown), and sinks 120 (of which sinks 120-1 through 120-5 are shown). It is noted that sources 110 and sinks 120 are also methods. The nodes therefore are methods and the calling relationships are indicated by the edges between nodes.

Each source 110 accepts an input 105. Each source 110 uses the input to return a value 130. The values 130 then propagate through the call graph 100, to end up at one or more of the sinks 120. During this process, the values 130 may be modified by the methods 115. For instance, the value 130-1 starts as V1, is modified (in flow 140-1) to V1-1 prior to the method 115-3, then the method 115-3 modifies this value 130-1 to V1-2 and calls sink 120-1 with V1-2. Method 115-3 also modifies this value 130-1 to V1-3 and calls sink 120-2 with V1-3. As another example, the value 130-1 starts as V1, is modified (in flow 140-2) to V1-4 prior to the method 115-4, then the method 115-4 modifies this value 130-1 to V1-5 and calls sink 120-3 with V1-5. Similar operations occur with the value 130-2: This value starts as V2, is modified (in flow 140-3) to V2-1 prior to the method 115-5, then the method 115-5 modifies this value 130-2 to V2-2 and calls sink 120-4 with V2-2. Similarly, the value 130-3 starts as V3, is modified (in flow 140-4) to V3-1 prior to the method 115-6, then the method 115-6 modifies this value 130-3 to V3-2 and calls sink 120-5 with V3-2. Each of the sinks uses the value 130-1 in a corresponding security-sensitive operation 125.

As a further example, the software program 101 could be a Web application that can handle hundreds or thousands of transactions. The transactions include input 105 from users, such as user names, passwords, credit transaction information, and the like. The input 105 therefore may be strings, and the values 130 could be the original text or modified values of the strings, such as through concatenation, replacement, and the like. The sinks 120 may be servlets that provide response hypertext markup language (HTML) documents based on the values 130, or access to certain pages based on input user names and passwords, which are typically used to access structured query language (SQL) databases for, e.g., user verification.

Use of the values 130 in the sinks 120 without some type of endorsement (e.g., sanitization or validation) can cause problems such as cross-site scripting (XSS) or SQL injection (SQLi). A sanitizer typically examines the content of a string and replaces/removes substrings not suitable for a sink, thereby preventing problems such as XSS or SQLi. In the example of the call graph 100, a single sanitizer 115-4 is shown, which sanitizes the flow 140-2. With regard to validators, a validation routine does not modify its input. Instead, this routine has a Boolean return value, which indicates whether the input's format conforms to the constraints imposed by the security-sensitive sink. Ideally, each of the flows 140 would have an appropriate endorser endorse the corresponding value 130 prior to the corresponding security sensitive operation 125.

As described above, this software program 101 could be analyzed using static analysis techniques. However, a limitation of static-analysis techniques lies in a tradeoff they are forced to make between precision and scalability. In order to be precise, all possible inputs 105 must be examined to all possible sources 110. All possible values 130 must be examined and propagated through the call graph 100 via all possible flows 140 to all possible sinks 120. Each flow 140 has to be checked to see if an appropriate endorser (e.g., sanitizer 115-4) operates on the values 130 prior to use in a corresponding security-sensitive operation 125.

For small programs, static analysis techniques can work very well, However, for large to very large programs, such as programs having millions of lines of code, static analysis techniques do not scale well to these programs, and many times precision is sacrificed in order to allow these large programs to be analyzed.

Novel approaches are proposed herein to address the challenge of building a precise yet scalable static analysis for security, where an exemplary analysis is concerned with verifying a set of queries. Each query is with respect to a given source in a particular set of activation contexts, where a source is a method whose return value is considered tainted (e.g., untrusted). Similarly, a sink is a pair (m, P), where m is a method that performs a security sensitive operation and P contains those parameters of m that are vulnerable to attack via tainted data. An endorser is a method that operates on a value to be communicated to a sink. The endorser could be, e.g., a sanitizer or a validator, as explained previously. These terms are used in what follows. An exemplary analysis should determine for each query whether the value returned from the source may flow to a security-sensitive operation without endorsement. If so, a vulnerability is flagged.

In other exemplary embodiments and in more general terms, it is possible to refer to sources and sinks as variables defined and used by program statements, respectively. For example, a field assignment may constitute a violation, and similarly, a field accessed via a field-read statement may be a source of a value that flows from the source to the sink.

An exemplary solution relies on building a scope for processing the query: An instrumented version of the target program is used to find a set of methods that have access to the value returned from a queried source. For instance, based on an analysis of execution of the software program 101, a set 191 (see FIG. 1) of methods 115 having access to the value 130-1 from the source 110-1 is determined (in this example, only methods 115-1 and 115-2 are shown from the set 191). During a static analysis of the program 101, using this set 191 of methods 115, the set 190 of methods is determined, e.g., as is a call graph 195 corresponding to the set 190. The call graph 195 is a portion of the complete call graph 100. This call graph 195 is then precisely examined. Thus, the invention provides both preciseness over some portion of the software program 101 and scalability.

Figure 2:
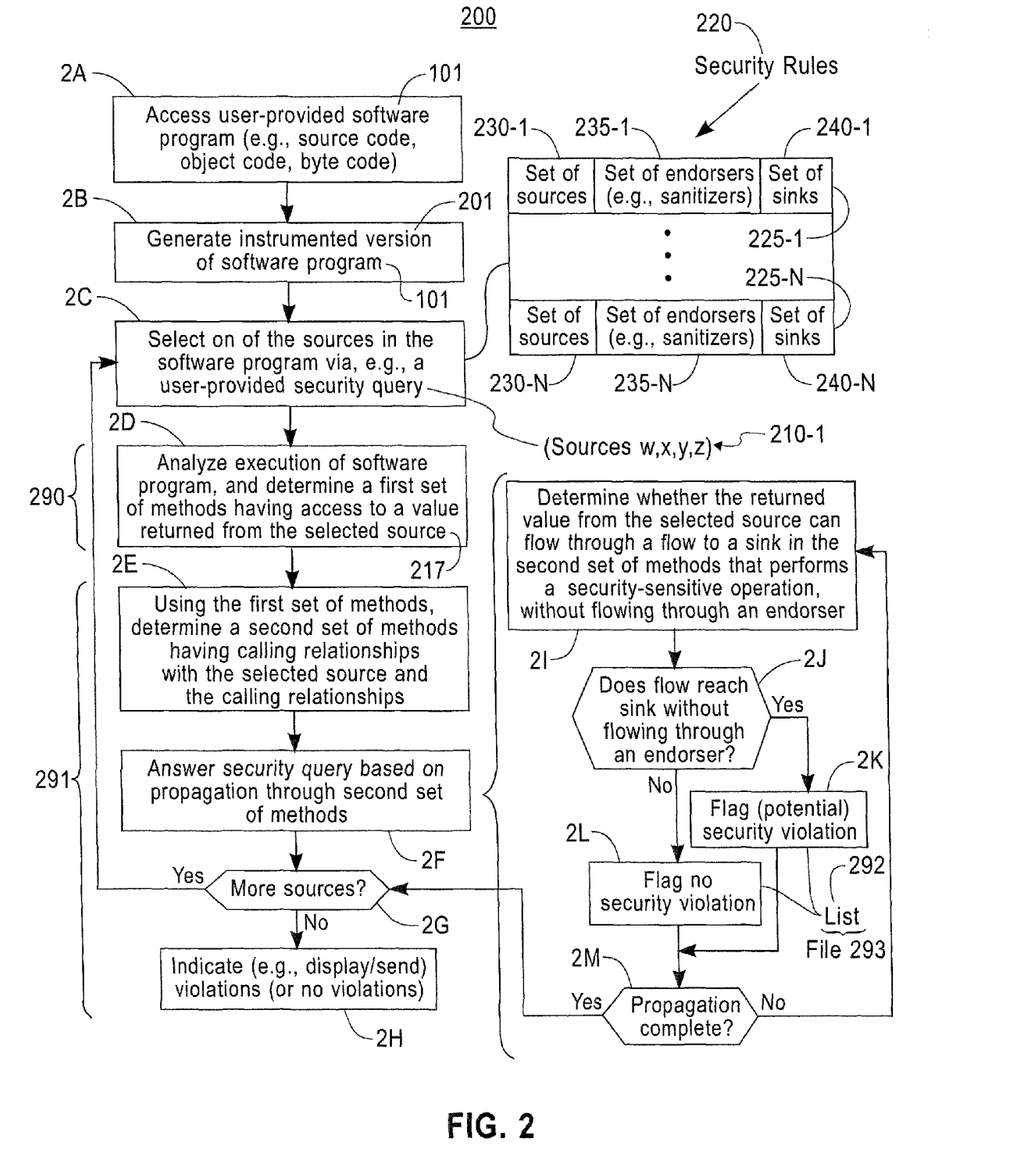
FIG. 2 is a flowchart of an exemplary method for answering security queries statically based on dynamically-determined information.

Turning now to FIG. 2, an exemplary method 200 is shown for answering security queries statically based on dynamically-determined information. Method 200 includes an overview of the operations taken for answering security queries statically based on dynamically-determined information. More specific examples are given below. The method 200 would be primarily performed by, e.g., the computer system shown in FIG. 8. In block 2A, a software program 101 (e.g., provided by a user) is accessed. The software program 101 can include source code, object code, byte code, library code, or any other code able to be processed. In block 2B, an instrumented version 201 of the software program is generated. Javassist (Java programming assistant) is one currently available tool for creating an instrumented version 201 of a Java software program 101. Javassist is a load-time reflective system for Java. It is a class library for editing bytecodes in Java. Javassist enables Java programs to define a new class at runtime and to modify a class file before the JVM (Java virtual machine) loads the class file.

In block 2C, one of the sources 110 in the software program 101 is selected. In an example, the user supplying the software program 101 also supplies a set of security rules 220. The set of security rules 220 includes individual rules 225, in this example, individual rules 225-1 through 225-N. This set of security rules 200 or portions thereof are used in various blocks of method 200. Each individual rule 225 includes a set of sources 230, a set of endorsers 235, and a set of sinks 240. Each of the set of sources 230 correspond to the sources 105 in FIG. 1, while each of the set of sinks 225 correspond to the sinks 120 in FIG. 1. In FIG. 2, one of the sources 230 is selected (selected source 217) via a user-provided security query 210, of which an example security query 210-1 contains indication(s) that sources W, X, Y, and Z are to be examined for security issues.

In block 2D, execution of the software program is analyzed (e.g., using the instrumented version 201 of the software program 101), and a first set 191 of methods is determined having access to a value 130 returned from the selected source 217. A more detailed example of block 2D is presented in FIG. 3. As stated above, an instrumented version 201 of the target program 101 is used, where an event is triggered on any operation the program performs; the arguments of the event reflect all the available data on the concrete objects participating in the operation. Reference 290 indicates block 2D is performed in realtime, via execution of the software program 101.

In block 2E, using the first set 191 of methods, a second set 190 of methods having calling relationships with the selected source 217 is determined, as are the calling relationships between the methods. A more detailed example of block 2E is presented in FIG. 5. Reference 291 indicates that block 2E is performed using a static analysis of the software program 101.

In block 2F, the security query 210 is answered based on propagation through the second set 190 of methods. In block 2G, it is determined if there are more sources (e.g., using the security query 210). If so (block 2G=YES), method 200 continues in block 2C; otherwise (block 2G=NO), method 200 indicates (e.g., via a display or by sending violations to a user via a network interface) whether the selected sources 210 had security violations or did not have security violations.

Blocks 2I through 2M include a general example of how block 2F might be performed. A more detailed example is described below in relation to FIG. 6. In block 2I, it is determined whether a returned value 130 from the selected source 210 can flow through a flow 140 to a sink 240 (e.g., a sink 120) in the second set 190 of methods that performs a security-sensitive operation without the flow 140 flowing through an endorser 235. It is noted that the security rules 220 are accessed in block 2I to determine an appropriate endorser 235 for the sink 240 that was reached as a result of a flow 140. If a flow 140 reaches a sink 240 without the flow 140 flowing through an endorser 235 (block 2J=YES), then a security violation is flagged in block 2K. This may be marked as a potential security violation since, e.g., it is possible that one of the methods 115 is an endorser that is not listed as an endorser 235. Block 2K can entail writing a list 292 of indications of security violations, e.g., into a file 293.

If a flow 140 reaches a sink 240 with the flow 140 flowing through an endorser 235 (block 2J=NO), then no security violation is flagged in block 2L. The list 292 and its file 293 may also contain indications of no security violations. In block 2M, it is determined if the propagation is complete (e.g., through all flows 140). If not (block 2M=No), the method 200 continues in block 2I; otherwise (block 2M=YES), the method 200 continues in block 2G.

It is noted that reference 291 indicates that the blocks 2E through 2M are performed via a static analysis of the software program 101. That is, an analysis where the software program 101 is not executed but is instead examined statically.

Now that an introduction has been made to exemplary embodiments of the instant invention, more detailed exemplary embodiments are now presented. These more detailed exemplary embodiments include the following operations.

Figure 3:
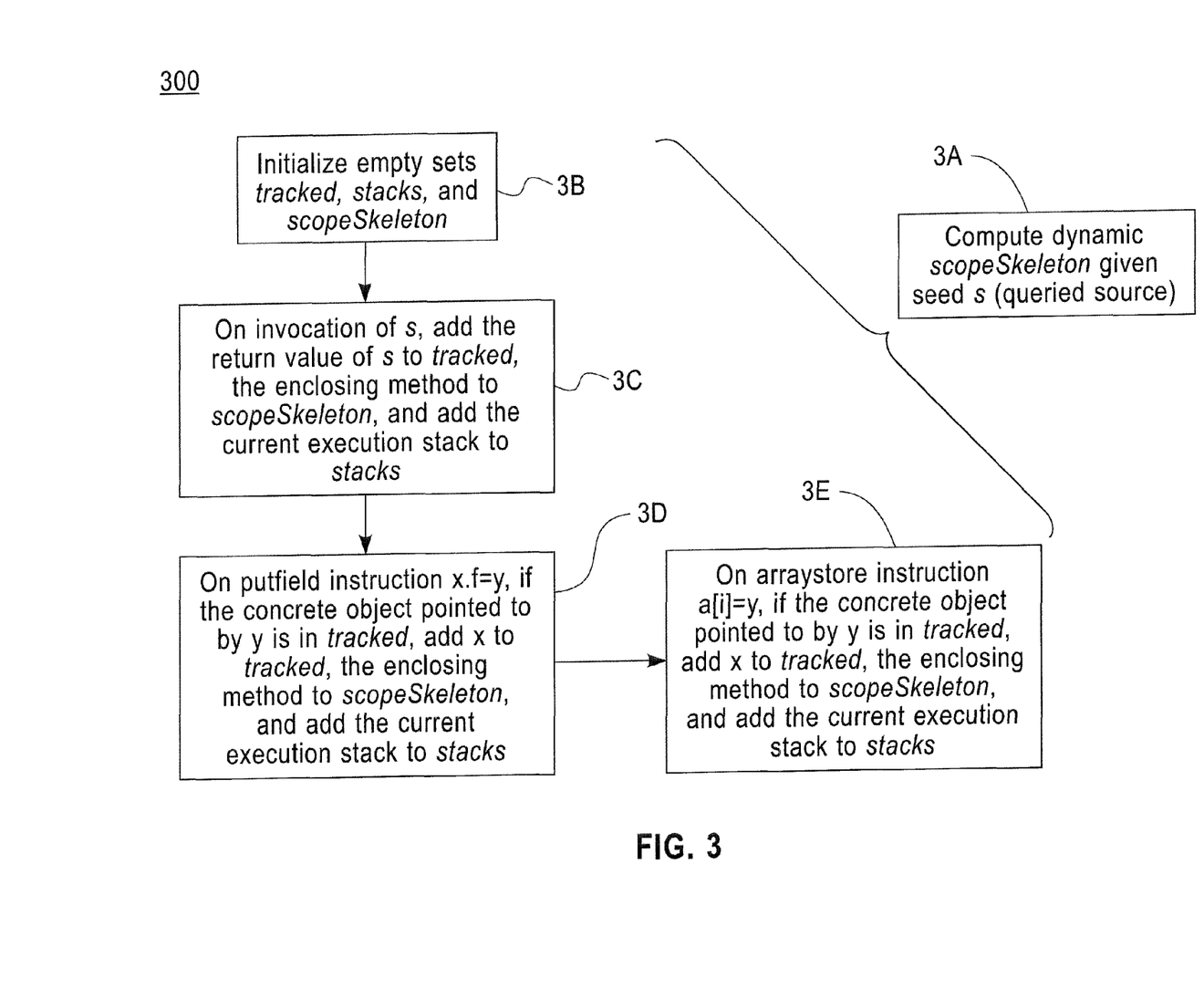
FIG. 3 is a flowchart of an exemplary method for performing a block of the method in FIG. 2.

Referring to FIG. 3, a method 300 is shown that is a more detailed version of block 2D of FIG. 2. In method 300, in block 3A, a dynamic "scope skeleton" is determined given seed s (where s is the source currently queried). Block 3A, in an example, may be performed by blocks 3B to 3E.

In block 3B, the empty sets tracked, stacks, and scopeSkeleton are initialized. The set tracked is used to hold concrete objects that are being tracked. The set stacks is used to hold versions of the execution stack. The set scopeSkeleton is used to hold methods that take part in data flow. In block 3C, on invocation of s during the execution of the software program 101, add the return value 130 to tracked, and the enclosing method to scopeSkeleton. Furthermore, add the current execution stack to stacks.

In block 3D, on putfield instruction x.f=y, if the concrete object pointed to by y is in tracked, add x to tracked, and the enclosing method to scopeSkeleton. Furthermore, add the current execution stack to stacks.

In block 3E, on arraystore instruction a[i]=y, if the concrete object pointed to by y is in tracked, add a to tracked, and the enclosing method to scopeSkeleton. Furthermore, add the current execution stack to stacks.

Figure 4:
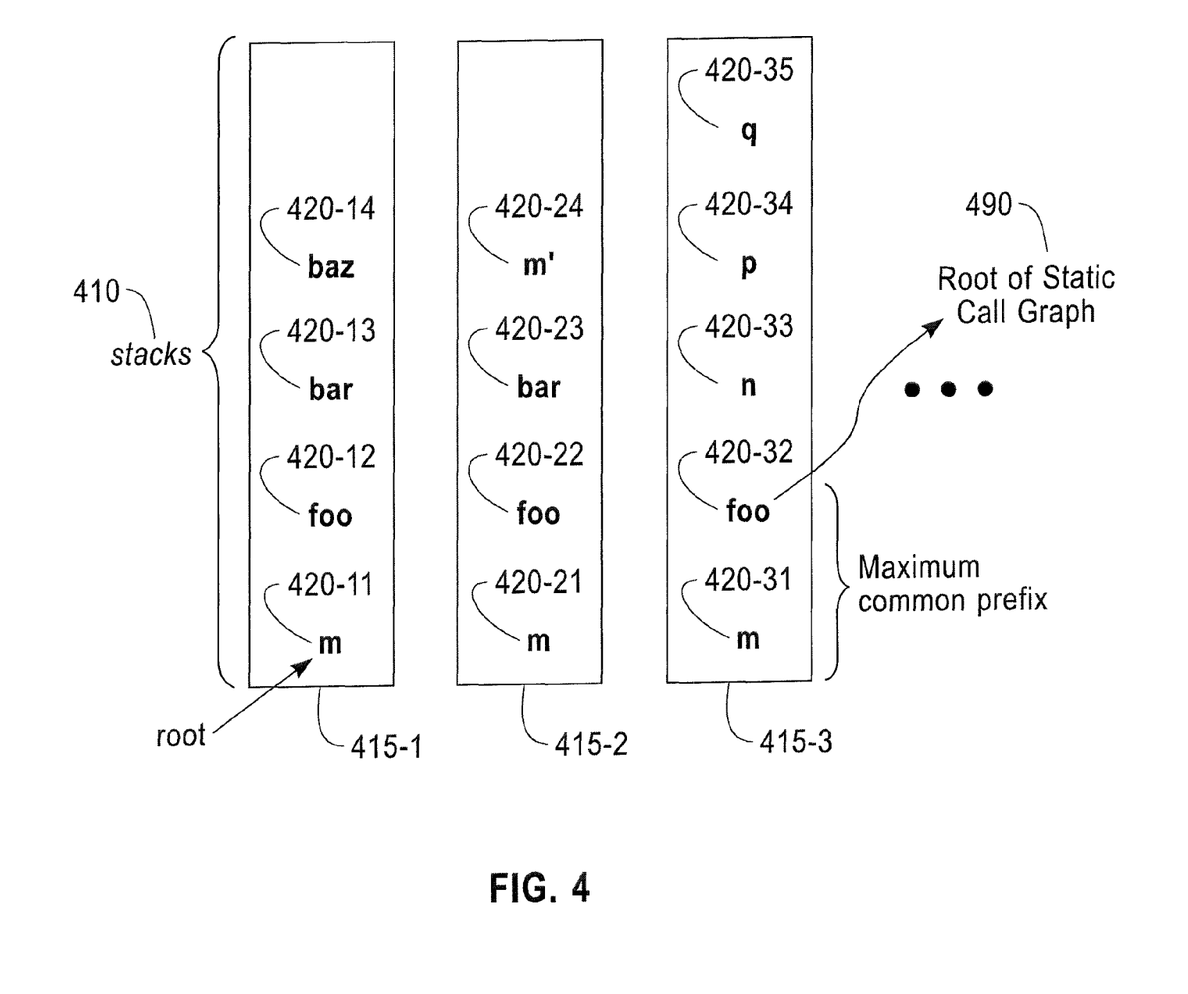
FIG. 4 is an example of a set of elements in stacks.

FIG. 4 is an example of a set of elements in stacks 410. In this example, the set of elements include stacks 415-1 through 415-3. Each of the stacks 415 includes names 420 of methods 115, at least some of which have access to the value 130 returned by the selected source 110, in the order in which the methods were executed. Thus, the stack 415-1 includes names 420-11, 420-12, 420-13, and 420-14; the stack 415-2 includes names 420-21, 420-22, 420-23, and 420-24; and the stack 415-3 includes names 420-31, 420-32, 420-33, 420-34, and 420-35. In stack 415-1, the method 115 with the name "m" (420-11) was executed before the method with the name "foo" (420-12) was executed. Each of the stacks 415 corresponds to whatever the execution stack is whenever a method is invoked that takes part in data flow from the source s. The methods 115 with names "m" and "foo" are the maximum common prefix, and the method 115 with name "m" is the root of the stacks, but "foo" is the root 490 of the static call graph to be created during a static analysis. That is, the dynamic analysis is used to determine the maximum common prefix and then to determine the root 490 ("foo") to be used in a subsequent static analysis. As this simple example shows, the method "m" no longer needs to be examined in the static analysis.

Figure 5:
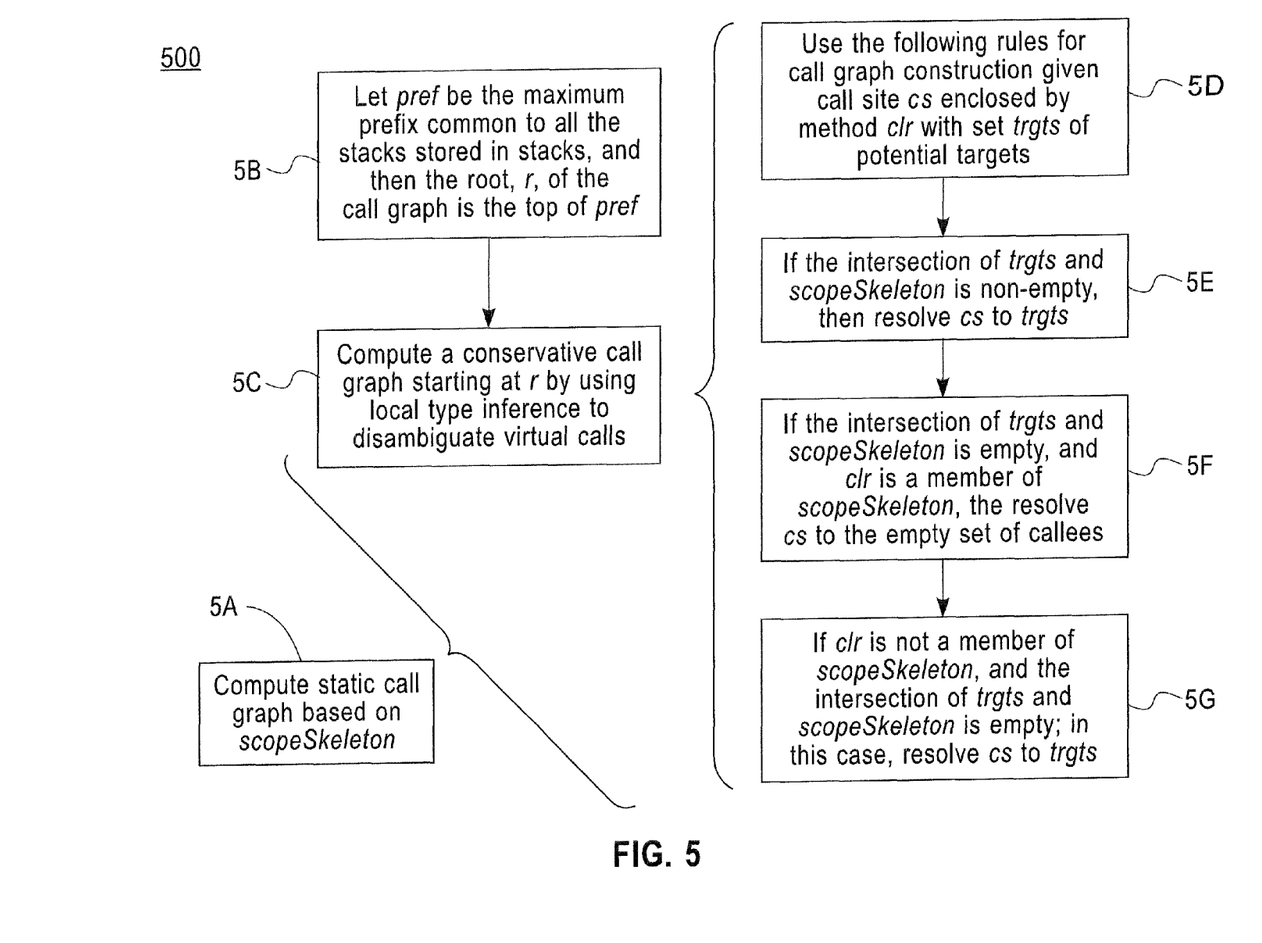
FIG. 5 is a flowchart of an exemplary method for performing a block of the method in FIG. 2.

Turning to FIG. 5, this figure is a flowchart of an exemplary method 500 for performing block 2E of the method 200 in FIG. 2. In block 5A, a static call graph (e.g., 195) is computed based on the scope skeleton determined from FIG. 3. Block 5A may be performed through blocks 5B through 5G.

In block 5B, let pref be the maximum prefix common (see "maximum common prefix" in FIG. 4) to all the stacks 415 stored in stacks. Then the root, r, of the call graph 195 is the top of pref. In the example of FIG. 4, the root r is root 490 ("foo"). Observe that the procedure described herein is well defined, since there is a unique common prefix shared by all stacks in stacks. The top method (e.g., "foo" in FIG. 4) is, indeed, the root of the scope to be analyzed, and this guarantees that in the concrete run observed during software program execution, no return value from an invocation of s flowed beyond s, to its transitive callers (in FIG. 4, "bar", "n", "baz", "m", "p", and "q" are the transitive callers).

In block 5C, the conservative call graph (e.g., 195) is computed starting at r (root 490, "foo", in FIG. 4) by using local type inference to disambiguate virtual calls. Use the following rules for call-graph construction, given call site cs enclosed by method clr with set trgts of potential targets (block 5D) (the trgts are a conservative resolution of the methods of the clr invoked at the call site cs, e.g., based on local type inference):

In block 5E, if the intersection of trgts and scopeSkeleton is non-empty, then resolve cs to trgts. In block 5F, if the intersection of trgts and scopeSkeleton is empty, and dr is a member of scopeSkeleton, then resolve cs to the empty set of callees. That is, cs is a broken call site.

In block 5G, the only remaining option is that clr is not a member of scopeSkeleton, and the intersection of trgts and scopeSkeleton is empty; in this case, resolve cs to trgts.

Figure 6:
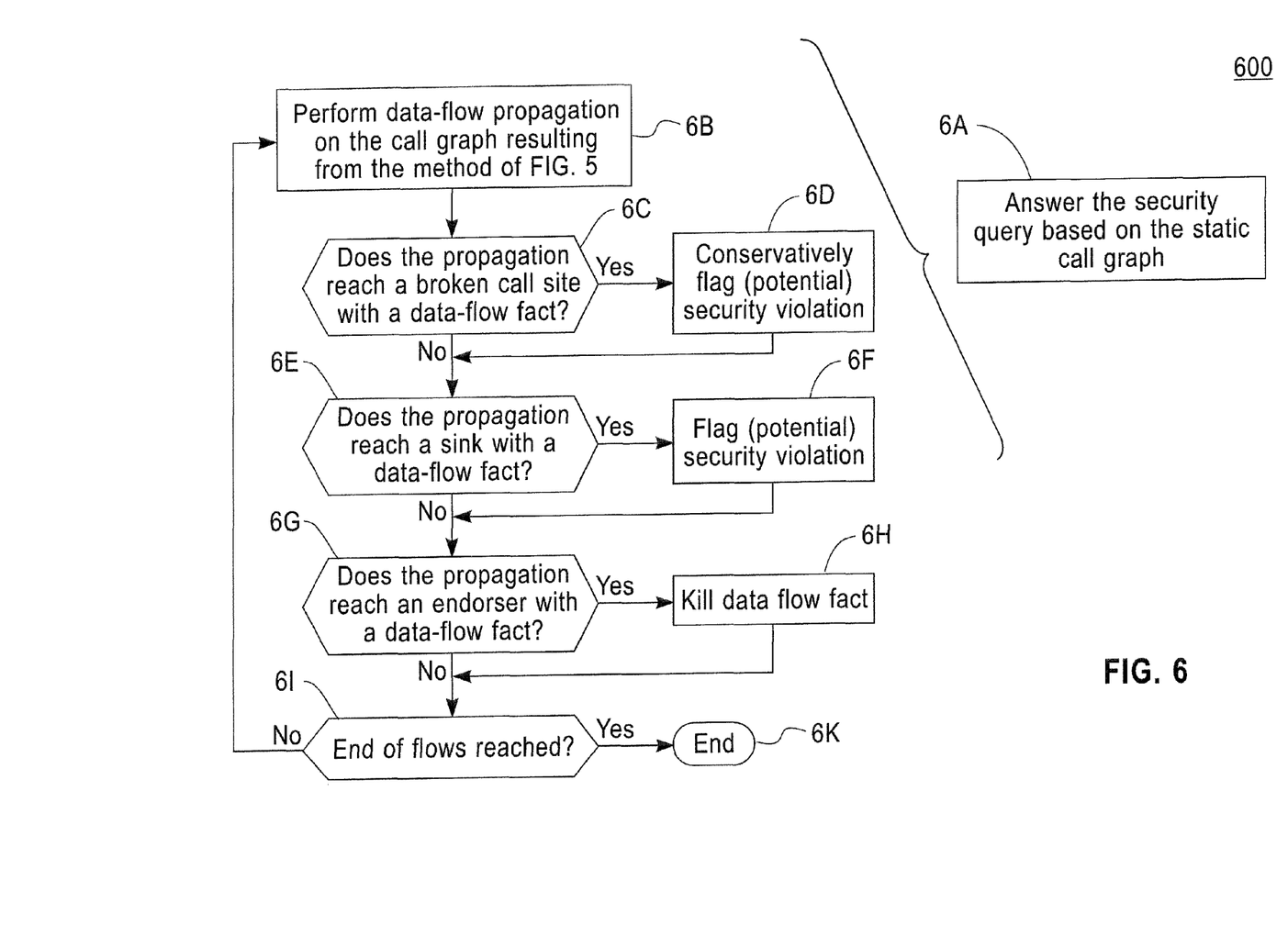
FIG. 6 is a flowchart of an exemplary method for performing a block of the method in FIG. 2.

Turning to FIG. 6, a flowchart is shown of an exemplary method 600 for performing block 2F of the method in FIG. 2. In block 6A, the security query 210 is answered based on the resulting static call graph (e.g., 195) determined in FIG. 5. A static call graph is a call graph determined using static analysis (e.g., as opposed to a dynamic call graph determined during execution of a software program). Block 6A may be performed by performing blocks 6B to 6K.

In block 6B, data-flow propagation is performed on the resulting call graph (e.g., 195) determined in FIG. 5. The data-flow propagation may be performed using, e.g., the IFDS (an Interprocedural, Finite, Distributive, Subset) algorithm and an access-path domain. The access-path domain is a representation of the heap, such that the access-path domain enumerates all possible ways to reach an object. The IFDS algorithm may be described as follows: every sink performing a security-sensitive operation is mapped to a dataflow fact instantiated at call sites in program entry points (e.g., such as a source). Facts are propagated throughout the program and killed only on normal exits of endorsement checks (e.g., they are not killed on exceptional exits). If the entry point of a sink receives the relevant data-flow fact, a potential problem is reported: there may exist a flow 140 that leads to a sink without an endorsement.

In block 6C, it is determined if the propagation reaches a broken call site with a data-flow fact. If so (block 6C=YES), then conservatively flag a violation (block 6D). Otherwise (block 6C=NO), it is determined if the propagation reaches a sink performing a security-sensitive operation 125 with a data-flow fact. If so (block 6E=YES), flag a violation (block 6F). This establishes a flow 140 from a source 230 to a sink

240. If the propagation does not reach a sink 240 with a data-flow fact (block 6E=NO), it is determined if the propagation reaches an endorser with a data-flow fact (block 6G). If so (block 6G=YES), the data-flow fact is killed (block 6H). Note that block 6H could also flag an indication of no security violation for the sink to which the flow 140 belongs. If not (block 6G=NO), it is determined if the end of the flows is reached in block 6I. If so (block 6I=YES), the method 600 ends in block 6K. Otherwise (block 6I=NO), the method continues in block 6B.

Figure 7:
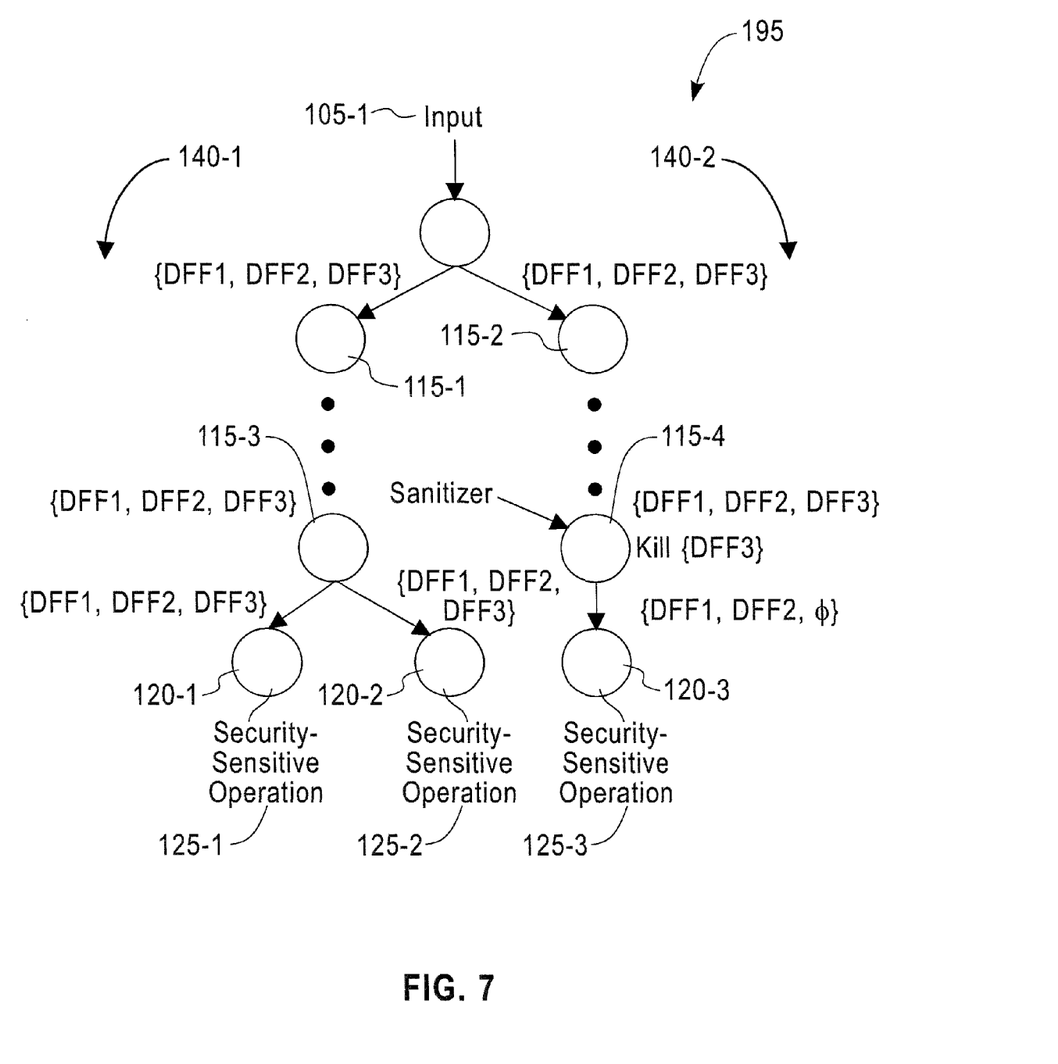
FIG. 7 is a portion of the call graph of FIG. 1, used to illustrate data fact flow through a call graph.

FIG. 7 is a call graph 195, which is a portion of the call graph 100 of FIG. 1, used to illustrate data fact flow through the call graph 195. The call graph 195 was computed by method 500 of FIG. 5. The data-flow facts (DFFs) are the DFF1, DFF2, and DFF3 shown in the figure. DFF1 is created because sink 120-1 performs a security-sensitive operation 125-1; DFF2 is created because sink 120-2 performs a security-sensitive operation 125-2; and DFF3 is created because sink 120-3 performs a security-sensitive operation 125-3.

For the sink 120-1, the data-flow fact DFF1 reaches this sink (block 6E of FIG. 6=YES) (i.e., where the data-flow fact has not been killed). Therefore, a security violation should be flagged (block 6F). Similarly, the data-flow fact DFF2 reaches the sink 120-2 (block 6E of FIG. 6=YES) (i.e., where the data-flow fact has not been killed). Therefore, a security violation should be flagged (block 6F). By contrast, a data-flow fact (DFF3) reaches the sanitizer 115-4 (block 6G of FIG. 6=YES), so the data-flow fact DFF2 is killed (block 6H). The sink 120-3 is reached thereafter, but with a null (e.g., φ) in the location where DFF3 should be. Therefore, in bock 6E, the propagation would reach the sink 120-3 but without a data-flow fact. Therefore, the method 600 would continue in block 6G.

It is noted in the examples in FIGS. 6 and 7 that the source 110-1 might be indicated as having a security violation if a data-flow fact reaches any of the sinks 120-1 through 120-3. In this case, two sinks 120-1 and 120-2 are reached with corresponding data-flow facts. Thus, an indication of no security violation made in block 6H does not overwrite an indication of a security violation made in block 6F, but an indication of a security violation made in block 6F may overwrite (depending on implementation) an indication of no security violation made in block 6H. This provides indications of security violations per source 110. However, this may be further subdivided according to sinks. In the example of FIG. 7, for the source 110-1, the sinks 120-1 and 120-2 could have an indication of security violations, but the sink 120-3 could have an indication of no security violation.

The motivation for computing the call graph 195 as prescribed by the method 500 of FIG. 5 is as follows: If the call site resolves to a method belonging in scopeSkeleton, then all other resolutions must also be recorded, as otherwise the ensuing analysis is unsound. If, on the other hand, the caller method is in scopeSkeleton, but none of the possible targets is in scopeSkeleton, then during execution of the program the call site was observed to be irrelevant (in that none of the methods it led to had access to an object returned by s). Thus, the call site can safely be ignored, and if a data-flow fact reaches the call site, then in the name of soundness, a violation is flagged.

The upshot of the above algorithm of FIGS. 3-6 is that using dynamically-computed information, it is possible to obtain a concise call graph 195 to be used for reasoning about a particular security query 210. This makes possible the combination of a highly precise algorithm for data-flow propagation, and the ability to run the algorithm on code bases comprising millions of lines of code. An exemplary embodiment has been implemented, and this embodiment has been demonstrated to be highly effective in practice: Reasoning about security sources lying deep inside huge code bases finishes in a fraction of a second, and the analysis is based on an abstraction that is prohibitively expensive for all known current techniques.

Figure 8:
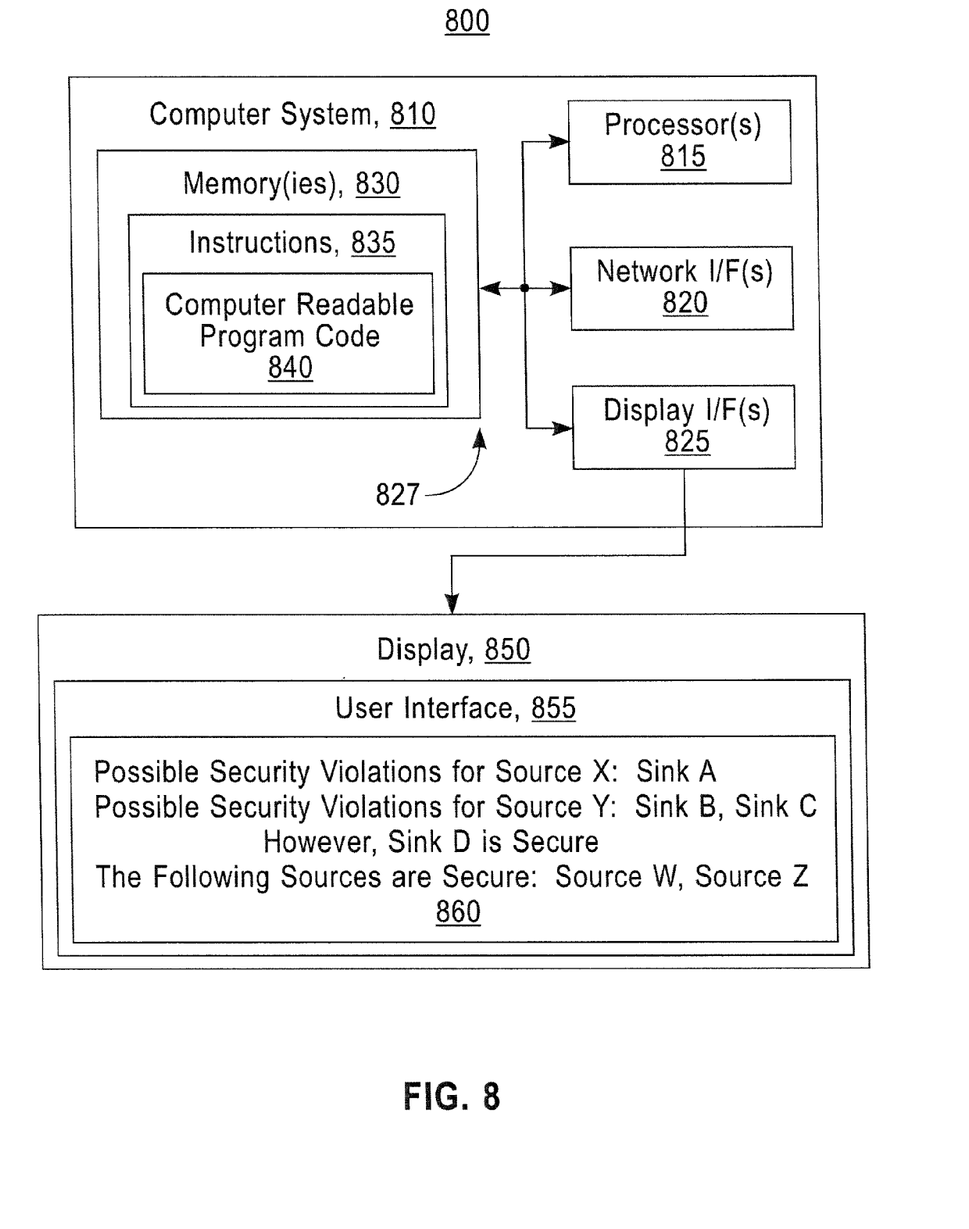
FIG. 8 is a block diagram of an exemplary system for answering security queries statically based on dynamically-determined information.

Referring now to FIG. 8, a block diagram is shown of an exemplary system 800 for answering security queries 210 statically based on dynamically-determined information. The system 800 in this example includes a computer system 810 and a display 850. The computer system 810 includes one or more processors 815, one or more network interfaces (I/Fs) 820, one or more display interfaces 825, and one or more memories 830, all interconnected via one or more buses 827. The one or more memories 830 include instructions 835 comprising computer readable program code 840. The computer readable program code 840, when executed by the one or more processors 815, causes the computer system 810 (e.g., and the display 850 if used) to perform one or more of the operations described herein. The one or more display interfaces 825 are used to drive the display 850 and present the user interface 855 on the display. The one or more network interfaces 820 may be wired or wireless, and may be used to communicate, e.g., the software program 101, and the file 293.

In this example, the user interface 855 displays a security report 860, e.g., displayed as output of block 2H of FIG. 2. This example indicates that possible security violations exist for Source X and its Sink A. Also, for Source Y, possible security violations are indicated for its Sinks B and C but not for its sink D. The latter might occur, for instance, in the example described above for FIG. 7, where for the source 110-1, the sinks 120-1 and 120-2 could have an indication of security violations, but the sink 120-3 could have an indication of no security violation. Sources W and Z are indicated as secure. These indications are based on the security query 210-1 of FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

accessing a security query comprising one or more indications of a plurality of sources in a software program;

selecting a selected source as one of the plurality of sources in the security query;

analyzing the software program while the software program is executed by a computer system, the software program having sources returning values, sinks that perform security-sensitive operations on those returned values or modified versions of the returned values, and flows of the returned values from the sources, through methods, and to the sinks, the analyzing determining a first set of methods having access to a value returned from the selected source;

performing a static analysis on the software program, the static analysis using the first set of methods to determine a second set of methods having calling relationships with the selected source, the static analysis further determining whether the returned value from the selected source can flow through a flow to a sink in the second set of methods that performs a security-sensitive operation without the flow to the sink being endorsed by an endorser, in response to determining the returned value from the selected source can flow through the flow to the sink in the second set of methods that performs a security-sensitive operation, indicating a security violation for the selected source, and in response to determining the returned value from the selected source cannot flow through the flow to the sink in the second set of methods that performs the security-sensitive operation, indicating there is no security violation for the selected source; and selecting another of the plurality of sources in the security query as a newly selected source, performing the analyzing execution using the newly selected source, performing the static analysis using the newly selected source, and performing the selecting another of the plurality of sources, performing the analyzing execution, and performing the static analysis until all of the plurality of sources in the security query have been selected.

2. The method of claim 1, wherein determining a first set of methods further comprises determining a plurality of stacks of methods, each stack of methods comprising an execution stack taken whenever a method is invoked that takes part in data flow from the selected source.

3. The method of claim 2, wherein using the first set of methods to determine a second set of methods having calling relationships with the selected source further comprises:
   determining a maximum common prefix in the plurality of stacks of methods;
   determining root method as a last method in the maximum common prefix; and
   computing a call graph based in part on the root method, the call graph containing the second set of methods.

4. The method of claim 1, wherein a source comprises a variable defined by a program statement and a corresponding sink comprises the variable used by another program statement.

5. The method of claim 1, wherein determining whether the returned value from the selected source can flow through a flow to a sink in the second set of methods that performs a security-sensitive operation without the flow to the sink being endorsed further comprises:
   propagating data-flow facts through the set of second methods using the calling relationships; and
   in response to a selected data-flow fact reaching a sink that performs a security-sensitive operation, flagging a security violation.

6. The method of claim 5, wherein determining whether the returned value from the selected source can flow through a flow to a sink in the second set of methods that performs a security-sensitive operation without the flow to the sink being endorsed further comprises:
   in response to a selected data-flow fact reaching a broken call site, flagging a security violation.

7. The method of claim 5, wherein determining whether the returned value from the selected source can flow through a flow to a sink in the second set of methods that performs a security-sensitive operation without the flow to the sink being endorsed further comprises:
   in response to a selected data-flow fact reaching an endorser, killing the selected data-flow fact; and
   in response to the killed selected data-flow fact reaching a sink in the second set of methods that performs a security-sensitive operation, flagging no security violation.

8. The method of claim 1, wherein indicating a security violation further comprises at least one of presenting an indication of the security violation on a display or communicating a file containing the indication of the security violation over a network interface.

9. The method of claim 1, wherein analyzing execution of the software program uses an instrumented version of the software program in order to determine operations performed by the software program.

10. A computer program product, comprising:
    a computer readable storage device having computer readable program code embodied therewith, the computer readable program code comprising:
    code for accessing a security query comprising one or more indications of a plurality of sources in a software program
    code for selecting a selected source as one of the plurality of sources in the security query;
    code for analyzing the software program while the software program is executed by a computer system, the software program having sources returning values, sinks that perform security-sensitive operations on those returned values or modified versions of the returned values, and flows of the returned values from the sources, through methods, and to the sinks, the analyzing determining a first set of methods having access to a value returned from the selected source;
    code for performing a static analysis on the software program, the static analysis using the first set of methods to determine a second set of methods having calling relationships with the selected source, the static analysis further determining whether the returned value from the selected source can flow through a flow to a sink in the second set of methods that performs a security-sensitive operation without the flow to the sink being endorsed by an endorser, and in response to determining the returned value from the selected source can flow through the flow to the sink in the second set of methods that performs a security-sensitive operation, indicating a security violation for the selected source, and in response to determining the returned value from the selected source cannot flow through the flow to the sink in the second set of methods that performs the security-sensitive operation, indicating there is no security violation for the selected source; and
    selecting another of the plurality of sources in the security query as a newly selected source, performing the analyzing execution using the newly selected source, performing the static analysis using the newly selected source, and performing the selecting another of the plurality of sources, performing the analyzing execution, and performing the static analysis until all of the plurality of sources in the security query have been selected.

11. The computer program product of claim 10, wherein determining a first set of methods further comprises determining a plurality of stacks of methods, each stack of methods comprising an execution stack taken whenever a method is invoked that takes part in data flow from the selected source.

12. The computer program product of claim 11, wherein using the first set of methods to determine a second set of methods having calling relationships with the selected source further comprises:
    determining a maximum common prefix in the plurality of stacks of methods;
    determining root method as a last method in the maximum common prefix; and
    computing a call graph based in part on the root method, the call graph containing the second set of methods.

13. The computer program product of claim 10, wherein determining whether the returned value from the selected source can flow through a flow to a sink in the second set of methods that performs a security-sensitive operation without the flow to the sink being endorsed further comprises:
    propagating data-flow facts through the set of second methods using the calling relationships; and
    in response to a selected data-flow fact reaching a sink that performs a security-sensitive operation, flagging a security violation.

14. The computer program product of claim 13, wherein determining whether the returned value from the selected source can flow through a flow to a sink in the second set of methods that performs a security-sensitive operation without the flow to the sink being endorsed further comprises:
    in response to a selected data-flow fact reaching a broken call site, flagging a security violation.

15. The computer program product of claim 13, wherein determining whether the returned value from the selected source can flow through a flow to a sink in the second set of methods that performs a security-sensitive operation without the flow to the sink being endorsed further comprises:
  in response to a selected data-flow fact reaching an endorser, killing the selected data-flow fact; and
  in response to the killed selected data-flow fact reaching a sink in the second set of methods that performs a security-sensitive operation, flagging no security violation.

16. The computer program product of claim 10, wherein indicating a security violation further comprises at least one of presenting an indication of the security violation on a display or communicating a file containing the indication of the security violation over a network interface.

17. An apparatus, comprising:
  at least one memory comprising computer readable program code; and
  at least one processor,
  wherein the computer readable program code, when executed by the at least one processor, cause the apparatus to perform at least the following:
  accessing a security query comprising one or more indications of a plurality of sources in a software program;
  selecting a selected source as one of the plurality of sources in the security query;
  analyzing the software program while the software program is executed by the apparatus, the software program having sources returning values, sinks that perform security-sensitive operations on those returned values or modified versions of the returned values, and flows of the returned values from the sources, through methods, and to the sinks, the analyzing determining a first set of methods having access to a value returned from the selected source;
  performing a static analysis on the software program, the static analysis using the first set of methods to determine a second set of methods having calling relationships with the selected source, the static analysis further determining whether the returned value from the selected source can flow through a flow to a sink in the second set of methods that performs a security-sensitive operation without the flow to the sink being endorsed by an endorser, and in response to determining the returned value from the selected source can flow through the flow to the sink in the second set of methods that performs a security-sensitive operation, indicating a security violation for the selected source, and in response to determining the returned value from the selected source cannot flow through the flow to the sink in the second set of methods that performs the security-sensitive operation, indicating there is no security violation for the selected source; and
  selecting another of the plurality of sources in the security query as a newly selected source, performing the analyzing execution using the newly selected source, performing the static analysis using the newly selected source, and performing the selecting another of the plurality of sources, performing the analyzing execution, and performing the static analysis until all of the plurality of sources in the security query have been selected.

18. The apparatus of claim 17, wherein determining a first set of methods further comprises determining a plurality of stacks of methods, each stack of methods comprising an execution stack taken whenever a method is invoked that takes part in data flow from the selected source.

19. The apparatus of claim 18, wherein using the first set of methods to determine a second set of methods having calling relationships with the selected source further comprises:
  determining a maximum common prefix in the plurality of stacks of methods;
  determining root method as a last method in the maximum common prefix; and
  computing a call graph based in part on the root method, the call graph containing the second set of methods.

20. The apparatus of claim 17, wherein determining whether the returned value from the selected source can flow through a flow to a sink in the second set of methods that performs a security-sensitive operation without the flow to the sink being endorsed further comprises:
  propagating data-flow facts through the set of second methods using the calling relationships; and
  in response to a selected data-flow fact reaching a sink that performs a security-sensitive operation, flagging a security violation.

21. The apparatus of claim 20, wherein determining whether the returned value from the selected source can flow through a flow to a sink in the second set of methods that performs a security-sensitive operation without the flow to the sink being endorsed further comprises:
  in response to a selected data-flow fact reaching a broken call site, flagging a security violation.

22. The apparatus of claim 20, wherein determining whether the returned value from the selected source can flow through a flow to a sink in the second set of methods that performs a security-sensitive operation without the flow to the sink being endorsed further comprises:
  in response to a selected data-flow fact reaching an endorser, killing the selected data-flow fact; and
  in response to the killed selected data-flow fact reaching a sink in the second set of methods that performs a security-sensitive operation, flagging no security violation.

23. The apparatus of claim 17, wherein indicating a security violation further comprises at least one of presenting an indication of the security violation on a display or communicating a file containing the indication of the security violation over a network interface.

* * * * *